United States Patent

Caspelherr et al.

[11] Patent Number: 5,547,277
[45] Date of Patent: Aug. 20, 1996

[54] PREHEATING SCREW

[75] Inventors: Heinz Caspelherr; Ulrich Hüwel, both of Köln, Germany

[73] Assignee: Klöckner-Humboldt-Deutz AG, Köln, Germany

[21] Appl. No.: 422,494

[22] Filed: Apr. 12, 1995

[30] Foreign Application Priority Data

Apr. 12, 1994 [DE] Germany ................... 44 12 536.4

[51] Int. Cl.⁶ .................................................. B01F 15/06
[52] U.S. Cl. ............................ 366/146; 366/147; 165/87; 219/523
[58] Field of Search ...................... 366/147, 146, 366/145, 144, 148, 149; 165/87; 219/221, 520, 522, 523

[56] References Cited

U.S. PATENT DOCUMENTS

| | | | |
|---|---|---|---|
| 2,722,716 | 11/1955 | Henning | 165/87 |
| 3,529,661 | 9/1970 | Yousch | 165/87 |
| 3,563,710 | 2/1971 | Dew | 366/147 |
| 3,800,865 | 4/1974 | Onarheim | 165/87 |
| 3,845,940 | 11/1974 | Lodige | 366/147 |

OTHER PUBLICATIONS

Brochure: Hollow–Screw Heat Exchangers (Hohlschnecken Wärmetauscher No. 1571 d/3.88) of the firm of Lurgi, Frankfurt am Main, Germany Date Mar. 1988.

Primary Examiner—Robert W. Jenkins
Attorney, Agent, or Firm—Hardaway Law Firm P.A.; Charles L. Schwab

[57] ABSTRACT

A preheating screw for the simultaneous mixing and heating of fine-grained or paste-like substances, in which intensive heat transfer takes place during transport of the substance by use of a rotating hollow screw that is filled with a heat-transfer medium, preferably a fluid, heat being transferred from the heat-transfer medium to the product by way of the heated hollow screw. An electrical heating device is installed in a hollow screw shaft, and is supplied with electrical energy via sliding contacts positioned on the outside of the screw shaft.

7 Claims, 1 Drawing Sheet

PREHEATING SCREW

TECHNICAL FIELD

This invention relates to a preheating screw for the simultaneous mixing and heating of fine-grained or paste-like substances, having at least one hollow screw rotating in a screw trough, the cavities of which screw—in the screw shaft and in the helical flight—are filled with a heat-transfer medium, preferably a fluid.

BACKGROUND OF THE INVENTION

Preheating screws have been used for the preheating and intensive mixing of petroleum coke for the manufacture of anode carbons. Preheating screws having rotating hollow screws through which a liquid heat-exchange medium flows, are described in the brochure "Hollow-Screw Heat Exchangers," 1571 d/3.88, of the firm of Lurgi, Frankfurt am Main. Typically, the heat exchanger liquid flows through the hollow shaft first and then, in the vicinity of the product discharge from the preheating screw, enters the last hollow helical flight and then flows through the helical flight in countercurrent to the product being transported in the screw trough.

From the processing standpoint, this known preheating screw has the disadvantage that the heat-transfer medium cools as a result of giving up heat to the product being heated, by which means an axial temperature gradient, appropriately oriented depending on the flow direction of the heat-transfer medium, comes into being. With regard to fabrication cost, it is disadvantageous that the heat-transfer medium is introduced into the rotating screw shaft from outside and must also be removed from the rotating screw shaft to the outside, for which purpose mechanically complicated and maintenance-intensive rotary couplings, called "seal caps" in the company brochure cited above, are required.

OBJECTS AND SUMMARY OF THE INVENTION

It is an object of the invention to create a preheating screw whose rotating screw shaft can be supported without a high fabrication cost and which that can be operated without a high maintenance cost and, if required or desired, with the avoidance of an axial temperature gradient.

By means of the design of the rotating hollow screw according to the invention-in contrast to the known hollow screws, the heat-transfer medium remains in the cavity inside the hollow screw, which cavity is completely sealed off to the outside. A number of advantages result from this construction. First, the enclosed cavity of the screw permits the elimination of the rotary coupling required in known preheating screws, in which the heat-transfer medium is introduced into the rotating hollow screw from outside and is led out again, and the use of an ordinary, lower-cost support for the hollow screw.

Since, in this invention, the heat-transfer medium no longer flows from the outside, through the hollow screw and then out of the hollow screw, but instead, remains inside the hollow screw, no axial temperature gradient forms, as occurred in the known preheating screws. With this invention, it is possible to establish a specified temperature profile by means of appropriate design of the heating device and also to maintain the temperature profile during the operation of the preheating screw.

Since the heat-transfer medium inside the hollow screw and inside the hollow screw flight is not circulated, the screw flight does not need to be continuous (in order to permit the flow of the heat-transfer medium through it) but can be interrupted by gaps, so that paddle-shaped or vane-shaped screw flight sections can be used. This permits intensive mixing with material transport reduced by means of the gaps, the change in the pitch of the screw flight sections according to the invention making it possible, further, to adapt the material transport to the requirements of the product being mixed.

BRIEF DESCRIPTION OF THE DRAWINGS

Further details, features and advantages of the invention can be seen from the following description of exemplary embodiments of the invention illustrated in the drawings, in which.

DETAILED DESCRIPTION OF THE DRAWINGS

Figure 1:
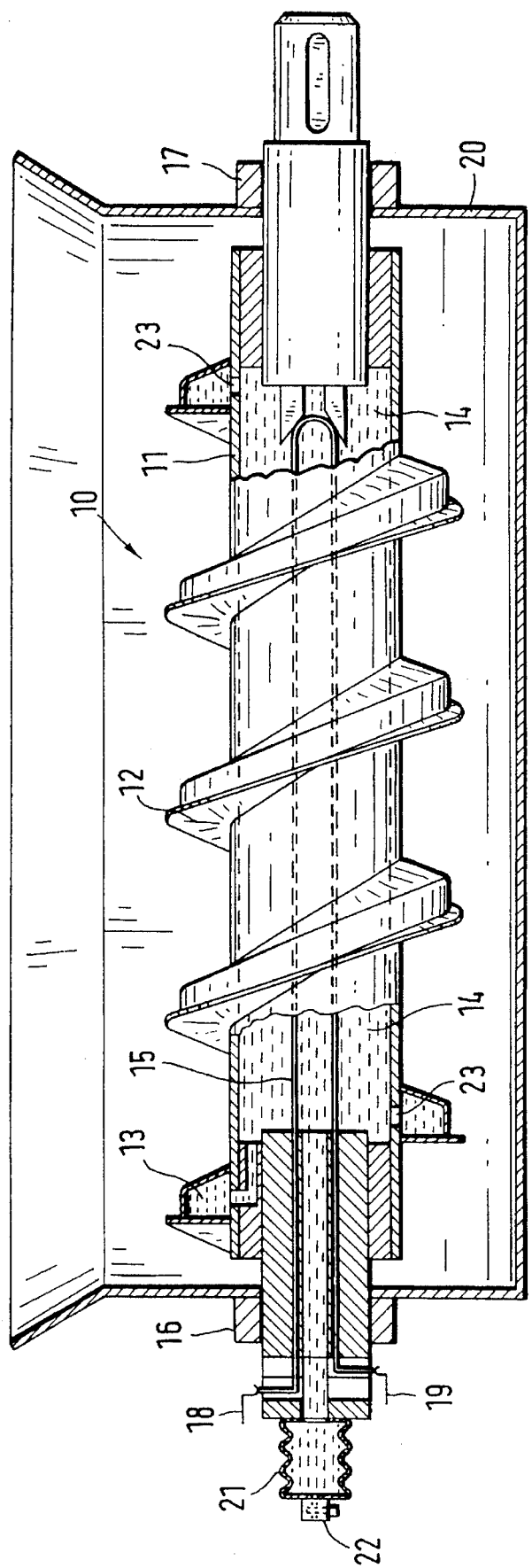
FIG. 1 is a lateral view of a hollow screw having a continuous screw flight.

FIG. 1 shows a hollow screw (10) rotatably supported by bearings (16, 17) in a screw trough (20). Arranged around the hollow screw shaft (11) inside the screw trough (20) is a hollow screw flight (12), the cavities (13) of which are connected to the cavity (14) of the screw shaft (11) via openings (23). These openings (23) are arranged equally spaced in the screw shaft shell over the entire screw shaft length, in order to create the best possible connection of the cavities (13) of the screw flight (12) with the cavity (14) of the screw shaft (11).

Toward one end, the left in FIG. 1, the hollow screw shaft (11) is brought outside the screw trough (20). It ends in a pressure-equalization element, in the form of a bellows compensator (21), on the end of which a pressure-control valve (22) intended for pressure control is connected. Inside the screw shaft is an electrical heating device (15), the electric line of which is likewise led to the outside through the screw shaft and which is supplied with electrical energy via sliding contacts (18, 19).

The cavities (13, 14) of the screw flight (12) and screw shaft (11), which cavities are connected to one another, thus form a common cavity completely sealed off to the outside, which cavity is filled with a heat-transfer medium and can be heated by the electrical heating device (15).

By means of appropriate design of the heating device (15), it is possible to exert an influence in the axial direction on the formation of a temperature gradient, or to prevent such a temperature gradient.

Figure 2:
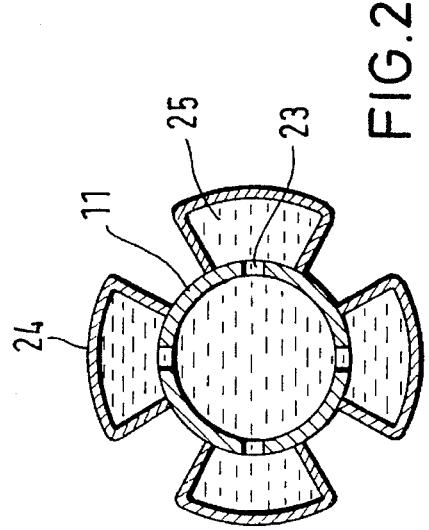
FIG. 2 is a section through a hollow screw having an interrupted screw flight.

In a further advantageous embodiment of the invention, illustrated in FIG. 2, gaps are provided in the screw flight so that the screw flight sections (24) arranged on the screw shaft (11 ) are made in paddle or vane form. By using gaps in the screw flight, the material capability of the screw flight is reduced, and more intensive mixing can be achieved by increasing the rotation speed of the screw shaft while simultaneously increasing the residence time of the mixing of the product by the preheating screw. This effect can be further enhanced according to the invention if the pitch of the screw flight sections is varied appropriately. For this purpose, it is necessary to rotatably connect the screw flight sections to the screw shaft for rotation about a radial axis (not illustrated in the drawing), and it is necessary to effect adequate sealing of the cavities (25) of the screw flight sections to the screw shaft (11).

That which is claimed:

1. A preheating screw for the simultaneous mixing and heating of fine-grained or paste-like substances, comprising:

a screw trough, a hollow screw rotatably mounted in said screw trough including a hollow screw shaft having a shell and a hollow helical flight secured to said shell, said screw shaft and said helical flight having cavities filled with a heat-transfer fluid, an electrical heating device (15) inside said hollow screw shaft (11), means supplying electrical energy to said heating device including sliding contacts (18, 19) on the outside of said screw shaft (11), a plurality of axially spaced openings (23) along the axial length of said screw shaft shell, said openings being equally spaced around the circumference of said shell and connecting said cavities of said screw shaft (14) and of said screw flight (13) to one another.

2. The preheating screw of claim 1, wherein said screw flight (12) includes spaced screw flight sections in the form of paddles connected to and extending radially from said shaft shell.

3. The preheating screw of claim 2, wherein the pitch of the screw flight sections is variable.

4. The preheating screw of claim 2 and further comprising an expansion compensator (21) connected to said screw shaft (14) and in fluid flow communication with said cavity of said screw shaft, said compensator (21) being operable to compensate for the expansion of said heat-transfer fluid.

5. The preheating screw of claim 4 and further comprising a safety valve (22) operable to control the pressure of said heat-transfer fluid, said safety valve being mounted on an end of said screw shaft (11) and in fluid flow communication with said cavity of said screw shaft.

6. The preheating screw of claim 1 and further comprising an expansion compensator (21) connected to said screw shaft (14) and in fluid flow communication with said cavity of said screw shaft, said compensator (21) being operable to compensate for the expansion of said heat-transfer fluid.

7. The preheating screw of claim 1 and further comprising a safety valve (22) operable to control the pressure of said heat-transfer fluid, said safety valve being mounted on an end of said screw shaft (11) and in fluid flow communication with said cavity of said screw shaft.

* * * * *